(12) United States Patent
Ramesh et al.

(10) Patent No.: US 11,899,831 B2
(45) Date of Patent: Feb. 13, 2024

(54) MANAGING SECURITY OF ENCLOSURE BASED ON A TASK STATUS AND GEOGRAPHICAL LOCATION OF THE ENCLOSURE

(71) Applicant: Hewlett Packard Enterprise Development LP, Houston, TX (US)

(72) Inventors: Bharath Ramesh, Houston, TX (US); Justin York, Cypress, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 234 days.

(21) Appl. No.: 17/475,748

(22) Filed: Sep. 15, 2021

(65) Prior Publication Data

US 2023/0091450 A1    Mar. 23, 2023

(51) Int. Cl.
*G06F 21/86* (2013.01)
*G06F 16/23* (2019.01)

(52) U.S. Cl.
CPC .............. *G06F 21/86* (2013.01); *G06F 16/23* (2019.01)

(58) Field of Classification Search
CPC .......... G06F 21/86; G06F 21/87; G06F 21/88; G06F 16/23
See application file for complete search history.

(56) References Cited

U.S. PATENT DOCUMENTS

| | | | |
|---|---|---|---|
| 6,910,137 B2 * | 6/2005 | Liebenow | G11B 20/00086 361/679.37 |
| 7,024,700 B1 * | 4/2006 | Horikoshi | G06F 21/88 726/36 |
| 7,644,290 B2 * | 1/2010 | Ransom | G06Q 50/06 340/568.1 |
| 8,561,138 B2 * | 10/2013 | Rothman | G06F 21/52 726/16 |
| 8,869,308 B2 * | 10/2014 | Soffer | G06F 21/85 713/189 |
| 11,463,256 B2 * | 10/2022 | Clark | H04L 9/3213 |
| 2003/0105904 A1 | 6/2003 | Abbondanzio et al. | |
| 2014/0047568 A1 | 2/2014 | Falk et al. | |
| 2015/0163229 A1 | 6/2015 | Lindteigen | |

* cited by examiner

*Primary Examiner* — Hosuk Song
(74) *Attorney, Agent, or Firm* — Hewlett Packard Enterprise Patent Department (57) ABSTRACT

Examples described herein relate to a method for managing hardware changes at an enclosure and a server. The enclosure includes a server and multiple hardware devices connected to the enclosure. A chassis manager in the enclosure is communicatively coupled to a manageability controller of the server and the multiple hardware devices. On enabling tamper detection, the manageability controller and the chassis manager monitor the hardware devices for determining changes in the hardware devices. A change in a hardware device is compared with a permissible hardware change to determine whether the change in the hardware device is unauthorized. The permissible hardware changes include changes in hardware devices that are permitted by a customer. Security actions are performed at the server and the enclosure if unauthorized changes in the hardware device are detected by the manageability controller and chassis manager.

18 Claims, 7 Drawing Sheets

FIG. 7

MANAGING SECURITY OF ENCLOSURE BASED ON A TASK STATUS AND GEOGRAPHICAL LOCATION OF THE ENCLOSURE

BACKGROUND

Edge devices are typically deployed in remote locations to collect and process large amounts of data associated with applications and provide local users with relevant insights. The insights based on the data collected and processed by the edge devices aid users in real-time decision-making.

BRIEF DESCRIPTION OF THE DRAWINGS

The following detailed description references the drawings, wherein.

Throughout the drawings, identical reference numbers may designate similar, but not necessarily identical, elements. Moreover, the drawings provide examples and/or implementations consistent with the description; however, the description is not limited to the examples and/or implementations provided in the drawings.

DETAILED DESCRIPTION

The following detailed description refers to the accompanying drawings. Wherever possible, same reference numbers are used in the drawings and the following description to refer to the same or similar parts. It is to be expressly understood that the drawings are for the purpose of illustration and description only. While several examples are described in this document, modifications, adaptations, and other implementations are possible. Accordingly, the following detailed description does not limit disclosed examples. Instead, the proper scope of the disclosed examples may be defined by the appended claims.

The terminology used herein is for the purpose of describing particular examples and is not intended to be limiting. As used herein, the singular forms "a," "an," and "the" are intended to include the plural forms as well, unless the context clearly indicates otherwise. The term "another," as used herein, is defined as at least a second or more. The term "coupled," as used herein, is defined as connected, whether directly without any intervening elements or indirectly with at least one intervening element, unless indicated otherwise. For example, two elements can be coupled mechanically, electrically, or communicatively linked through a communication channel, pathway, network, or system. Further, the term "and/or" as used herein refers to and encompasses any and all possible combinations of the associated listed items. As used herein, the term "includes" means includes but is not limited to, the term "including" means including but not limited to. The term "based on" means based at least in part on.

Edge devices are different from devices used in data center in several ways. The edge devices are deployed outside a secure data center environment. For instance, the edge devices are deployed at sites that may not have levels of physical access control and monitoring that a device present at the data center or even a branch office environment is used to. Further, edge devices used by customers may go through multiple changes after receiving a configured edge device from the manufacturer and before being deployed at remote locations. A customer or a partner may add additional hardware devices specific to their requirements at a warehouse or an office. In some examples, the customer may add a specialized industrial input/output (IO) card or a peripheral component interconnect (PCI) encryption device. Further, end-user 112 at a remote site may make additional hardware changes to an edge device before deploying it.

Further, at remote sites, there is a higher risk of tampering with the edge devices as the level of physical security may be reduced. There are chances that an adversary or an attacker may add a malicious hardware device that may include the edge device at the remote sites. The malicious hardware device may be used for modifying the software and/or operating system of the edge devices. In some cases, the attacker may remove hardware devices that may impact the processing of applications on the edge devices. Hence, the hardware devices connected to the edge devices may be monitored to detect changes in the hardware devices at run time or between reboots. With the increased use of hot-swappable hardware devices (e.g., devices that can be removed and replaced without stopping the operation of the edge devices) and customers modifying the hardware on edge devices at remote sites, it becomes challenging for monitoring systems and tamper detection systems to differentiate between allowable hardware changes performed by the customer and malicious hardware injection by the attacker.

Therefore, in accordance with the aspects of the present disclosure, a method and system for managing hardware changes at an enclosure level and a server level are presented that may obviate one or more of the challenges mentioned hereinabove. An enclosure may host one or more servers and a plurality of hardware devices connected to the enclosure and/or the servers. The enclosure may also be referred to as a blade enclosure or a chassis. As used herein the term "hardware device" refers to any component that can be connected to the enclosure and/or to one or more servers hosted in the enclosure. Examples of hardware devices include, but are not limited to, servers, memory devices, peripheral devices, storage devices, switches, fans, power supply, and other devices.

To manage physical security of hardware devices connected to the enclosure at remote locations, hardware devices may be monitored to detect hardware changes. Any change in a hardware device that is outside expected parameters may trigger appropriate remedial actions. The changes in hardware inventory may be managed at the server level and at the enclosure level by a manageability controller and a chassis manager, respectively. A change in the hardware device that is outside expected parameters may indicate an attempt to install rogue peripherals, tamper with data or remove hardware devices containing sensitive data. On detecting a change that is outside the expected parameters, the chassis manager and the manageability controller may automatically perform security actions at the enclosure level or the server level.

In some examples, the manageability controller of a server may determine if tamper detection is enabled. The tamper detection is enabled to monitor changes in a set of hardware devices associated with the server. The tamper detection may be enabled at the enclosure and the server based on a location of the enclosure. During operation, on determining that the tamper detection is enabled, the manageability controller may perform a comparison to determine if there is a change in the hardware device in the set of hardware devices. A current hardware configuration of the set of hardware devices associated with the server is compared with a baseline hardware configuration of the set of the hardware devices. As used herein the term "current hardware configuration" refers to a current snapshot of the set of hardware devices associated with the server or a current snapshot of the plurality of hardware devices connected to the enclosure taken any given instance of time. The current hardware configuration includes a hardware type and a serial number of the hardware device for each hardware device in the respective current snapshot at the given instance of time. As used herein, the term "baseline hardware configuration" refers to a snapshot of the set of hardware devices associated with the server or a snapshot of the plurality of hardware devices connected to the enclosure taken before being deployed in a remote location or taken when tamper detection is enabled at the server and enclosure respectively. The baseline hardware configuration includes a hardware type and a serial number of the hardware device for each hardware device in the respective snapshot before being deployed or when tamper detection is enabled. Once the change in the hardware device is detected, the manageability controller may determine whether the change in the hardware device is unauthorized by comparing the change in the hardware device with a permissible hardware change for the hardware device. If the change in the hardware device is unauthorized, the manageability controller may perform a security action at the server. As used herein, the term "permissible hardware change" refers to change in a hardware device that is permitted by a customer.

In some examples, a chassis manager in the enclosure may monitor the hardware changes in the plurality of hardware devices connected to the enclosure. The chassis manager of the enclosure is communicatively coupled to the manageability controller of the server and the plurality of hardware devices. The chassis manager may detect removal of the hardware device and insertion of a new hardware device at slots of the enclosure using status from presence pins at slots of the enclosure. If unauthorized changes are detected by the chassis manager, the chassis manager may perform a security action.

By using permissible hardware changes at both the server level and the enclosure level, any unauthorized hardware change at the remote locations may be managed by the manageability controller and the chassis manager. Any unauthorized changes may be detected and a security action may be performed automatically at the server level or the enclosure level without human interaction. Further, as any allowable (e.g., permitted) changes to hardware devices are being defined in permissible hardware changes, the manageability controller and the chassis manager may easily differentiate between authorized hardware changes and unauthorized hardware changes.

Additionally, automatically enabling the tamper detection based on a geographical location allows customers to prevent unauthorized modifications at remote locations away from a base location. In some examples, the tamper detection may be enabled if the enclosure leaves the base location. This type of enablement of the tamper detection may allow customers to change the hardware devices at the base location. In some examples, the changes in hardware devices may be considered as unauthorized if the enclosure leaves the base location and if the change is hardware device is not permitted as per the permissible hardware changes.

Figure 1:
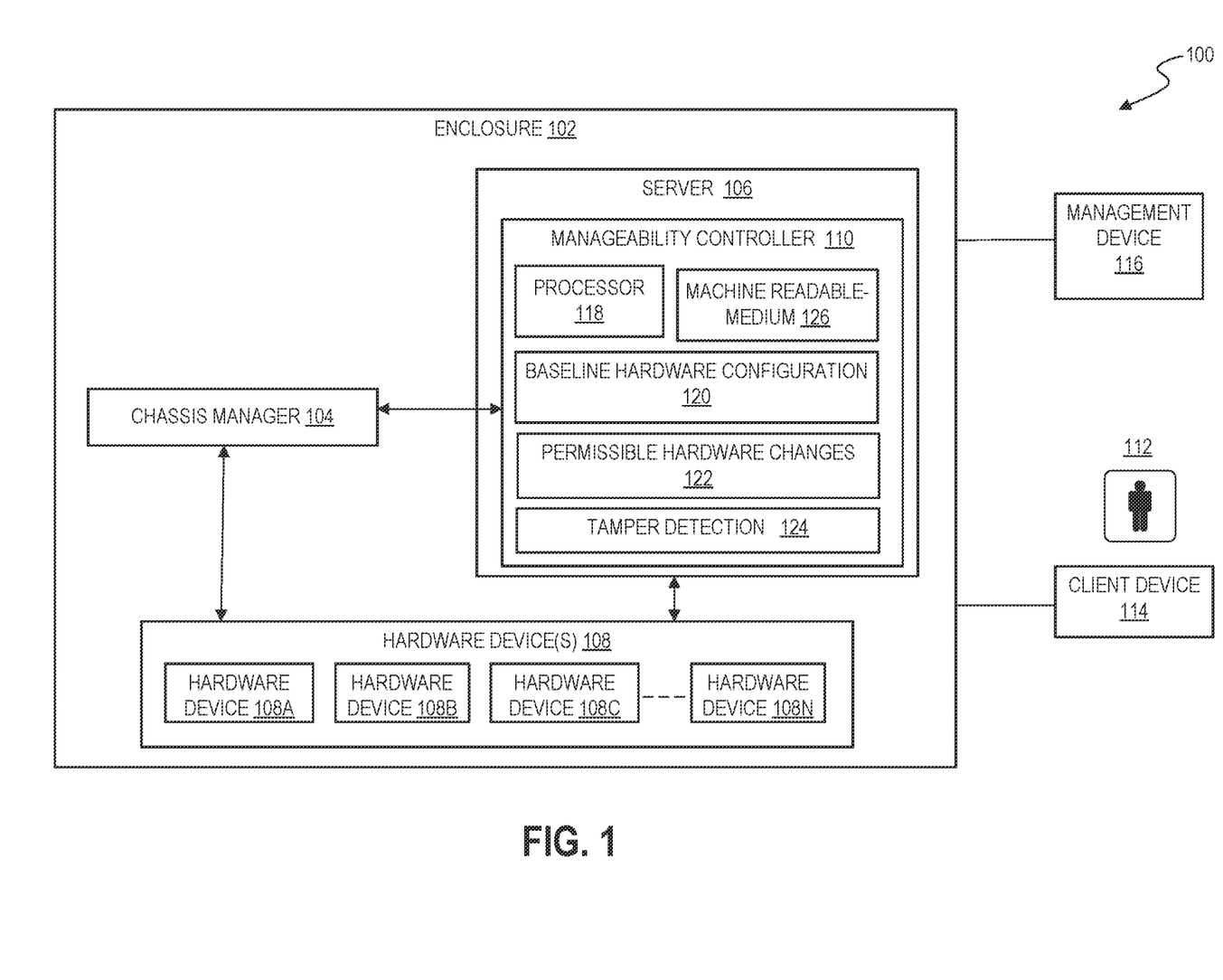
FIG. 1 is a block diagram of an example system capable of managing changes in hardware devices.

Referring now to figures, FIG. 1 depicts a block diagram of an example system 100 capable of managing hardware changes at a server level. The system 100 includes an enclosure 102 that is in communication with a management device 116 and an end-user 112 via the client device 114. The enclosure 102 may include a chassis manager 104, a server 106, and a plurality of hardware devices 108A, 108B, 108C, . . . , 108N (hereinafter collectively referred to as hardware devices 108) connected to the enclosure 102. Although FIG. 1 shows a single server 106 for purposes of illustration and explanation, and it should be understood that the enclosure 102 may support multiple servers. Besides the server 106 and the hardware devices 108, the enclosure 102 may also include power supplies, input/output (I/O) devices, cooling devices, administration modules, and other devices. However, for purposes of illustration, the enclosure 102 is shown without any of these devices. The enclosure 102 may provide power, cooling, networking, and access to the hardware devices 108 for the server 106.

In some examples, the management device 116 may be in communication with the enclosure 102 via a network. The management device 116 may configure the enclosure 102 and the server 106. Further, in some examples, the end-user 112 may communicate with the chassis manager 104 and the server 106 via the network. The end-user 112 receives data processed by the server 106 on a client device 114. The network may include, but is not limited to, a wired Ethernet, a Wi-Fi, a private 5G network, a satellite network, and other networks which are available at a location of the enclosure. The network to be used at the enclosure 102 may be preconfigured based on cost, a priority assigned to information being transmitted from the server 106, or availability of the network.

In some examples, the chassis manager 104 may be a lead chassis manager that is in communication with a group of chassis. The chassis manager 104 may be an embedded system management hardware and software solution to manage the server 106, networking, and the hardware devices 108 within the enclosure 102. The chassis manager 104 may perform inventory collection, configuration, monitoring operations, and enable alerts for events on the server 106, and other components in the enclosure 102. Certain functionalities of the enclosure 102 may be managed and monitored by the chassis manager 104. In some examples, the chassis manager 104 may be plugged into a modular blade chassis and powered by the power supply of the enclosure 102.

The server 106 may be a self-contained computing device on at least one single, mountable board. The server 106 may also be referred to as blade server or a server blade. In some examples, the server 106 in the enclosure 102 may be dedicated to processing data related to a single application or multiple applications. Further, the server 106 may include a manageability controller 110 and a network interface coupled to the manageability controller 110. It is to be noted that FIG. 1 shows the manageability controller 110 for the server 106 for illustration and explanation purposes, however, there may be other servers hosted on the enclosure 102 that may include respective manageability controllers and other components and may perform operations similar to the manageability controller 110 of the server 106.

In some examples, the manageability controller 110 can be used to implement services for the server 106. The manageability controller 110 can provide so-called "lights-out" functionality for the server 106. The lights-out functionality may allow a user, such as a systems administrator, to perform management operations on the server 106 even if an operating system is not installed or not functional on the server 106. The manageability controller 110 may also provide so-called "out-of-band" services, such as remote console access, remote reboot, monitoring the health of the server 106, access to server logs, and the like. As used herein, the manageability controller 110 has management capabilities for sub-systems of the server 106 and is separate from the processor that executes a main operating system of the server 106. The manageability controller 110 may comprise an interface, such as a network interface, and/or serial interface that an administrator can use to remotely communicate with the manageability controller 110. In some examples, sensors associated with the manageability controller 110 can measure internal physical variables such as humidity, temperature, power supply voltage, communications parameters, fan speeds, operating system functions, or the like.

The manageability controller 110 may be implemented using a processor 118 that is different from the host processor (of the server 106) that is used to execute a high-level operating system. The processor 118 of the manageability controller 110 may be implemented as one or more microprocessors, microcomputers, microcontrollers, digital signal processors, central processing units, state machines, logic circuitries, and/or any devices that manipulate signals based on operational instructions. The processor 118 may be configured to execute instructions (e.g., programming or software code) stored in a machine-readable medium 126 to perform functions related to managing hardware changes at the server 106 as described herein.

Examples of the hardware devices 108 that are to be managed at the enclosure 102 may include, but are not limited to memory devices, peripheral devices, storage devices, and other devices. The memory devices may store information. In certain examples, the server 106 may as well be a hardware device that may be managed at the enclosure level. The memory devices can be volatile or non-volatile. Further, the memory devices may be addressable by a processor of the server 106. An example of a memory device includes the Dual Inline Memory Module (DIMM). The peripheral devices may include, but are not limited to devices such as Universal Serial Bus (USB), Micro USB, PCI, PCI Express, PCI extended, serial AT attachment, audio circuitry, integrated Ethernet, enhanced host controller interfaces, combinations thereof, etc. The peripheral devices are connected to the slots in the enclosure 102. The server 106 may communicate with the peripheral devices using bus communication. Other peripheral devices may include, but are not limited to, mouse, keyboard, and biometric identification devices. The storage devices may include Hard Disk Drives (HDDs), or Solid-State Drives (SSD). In addition to the above hardware devices, other hardware devices may include, but are not limited to, network switches, fans, and power supplies.

In some examples, to detect hardware changes the manageability controller 110 may maintain a baseline hardware configuration 120 for the server 106. In some cases, the baseline hardware configuration 120 may be provided to the manageability controller 110 before the enclosure 102 is shipped to the remote location. In other cases, the baseline hardware configuration 120 may be captured by the manageability controller 110 upon enabling the tamper detection 124 (described later) at the server 106. The baseline hardware configuration 120 refers to a snapshot of the set of hardware devices associated with the server 106. In some cases, the snapshot is taken before being deployed in a remote location. In other cases, the snapshot is taken when tamper detection is enabled at the server 106. The baseline hardware configuration 120 includes a hardware type and a serial number of the hardware device for each hardware device in the set of hardware devices.

In some examples, in addition to the baseline hardware configuration 120, the manageability controller 110 may maintain permissible hardware changes 122 for the set of hardware devices 108 associated with the server 106. The permissible hardware changes 122 include hardware changes that may be allowed in each hardware device in the set of hardware devices 108 associated with the server 106 by a customer. For example, it may be permitted to change a graphic card associated with the server 106 with a graphic card of the same manufacturer and same model type. Any change in a hardware device that is not permitted as per the permissible hardware changes 122 is considered as an unauthorized change.

In some examples, the baseline hardware configuration 120 and the permissible hardware changes 122 may be defined using data structures. Further in some examples, the baseline hardware configuration 120 and the permissible hardware changes 122 may be stored as JavaScript Object Notation (JSON) file. In some examples, the baseline hardware configuration 120 and the permissible hardware changes 122 may be combined and loaded into the manageability controller 110 while the server 106 is configured before being deployed at the remote location.

Further, in some examples, to determine if hardware changes are to be monitored and managed, the manageability controller 110 may include the tamper detection 124. In some examples, the tamper detection 124 is a logical or physical tripwire (e.g., a tamper latch) that may be enabled at the server 106 level. In some cases, the tamper detection 124 may be enabled manually by an end-user 112 or by remote instructions from the management device 116. Once the tamper detection 124 is enabled, the manageability controller 110 may start monitoring the set of hardware device 108 to detect changes and manage hardware changes.

During operation, once the tamper detection 124 is enabled, the manageability controller 110 of the server 106 may monitor the set of hardware devices 108 associated with the server 106. A current hardware configuration of the set of hardware devices 108 may be compared with the baseline hardware configuration 120 to detect changes in the set of hardware devices 108. The current hardware configuration refers to a current snapshot of the set of hardware devices 108 associated with the server 106. When tamper detection 124 is enabled, the manageability controller 110 may periodically determine the current hardware configuration and compare it with the baseline hardware configuration 120. The hardware type and the serial number of each hardware device in the current hardware configuration are compared with the respective hardware type and respective serial number in the baseline hardware configuration 120 to detect a change in a hardware device. Any change in the hardware device may be compared with a permissible hardware change for the hardware device defined in the permissible hardware changes 122 to determine if the change in hardware is unauthorized. Further, in some examples, if the change in the hardware device is unauthorized a security action may be performed at the server 106. The details of detecting hardware changes and performing security action that is performed is described in detail in FIGS. 3-4.

Figure 2:
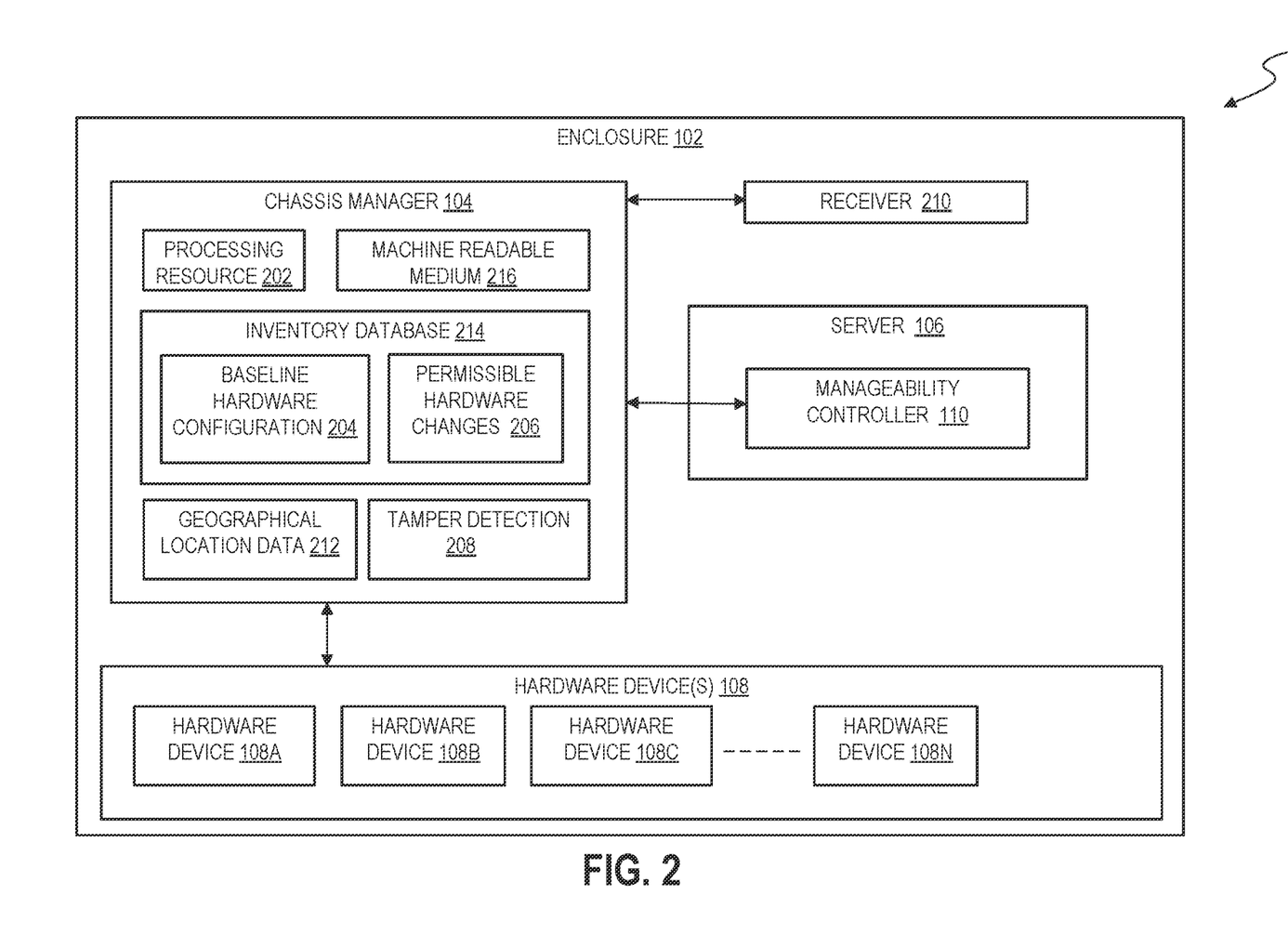
FIG. 2 is a block diagram of another example system capable of managing changes in hardware.

FIG. 2 is a block diagram of an example system 200 capable of managing changes in hardware devices 108 at the enclosure 102 level. The system 200 of FIG. 2 may be an example representative of the system 100 of FIG. 1 and include certain components similar to those described in FIG. 1. The system 200 may include the enclosure 102 that manages the changes in hardware devices using the chassis manager 104. The chassis manager 104 may be communicatively coupled to the manageability controller 110 of the server 106 and the hardware devices 108. The chassis manager 104 may communicate with the manageability controller 110 of the server 106 via an Ethernet-based Out of Band (OOB) communication channel using an OOB service provided by the manageability controller 110 of the server 106. In an example, the OOB communication channel may be a dedicated management channel (e.g., a network interface or a serial interface).

The chassis manager 104 may be implemented using a processing resource 202 and a machine-readable medium 216. The processing resource 202 of the chassis manager 104 may be implemented as one or more microprocessors, microcomputers, microcontrollers, digital signal processors, central processing units, state machines, logic circuitries, and/or any devices that manipulate signals based on operational instructions. The processing resource 202 may be configured to execute instructions (e.g., programming or software code) stored in the machine-readable medium 216 to perform functions related to managing hardware changes at the enclosure 102 as described herein.

In some examples, to monitor the changes in the hardware devices 108, the chassis manager 104 may maintain an inventory database 214. The inventory database 214 may store information related to a type (e.g., model type) of the hardware devices 108 and a unique identifier of the hardware device in each slot of the enclosure 102. In some examples, the unique identifier may include serial number and/or media access layer (MAC) address. In some examples, the chassis manager 104 may perform periodic hardware polling of the plurality of hardware devices 108 connected to the slots in the enclosure 102 to receive information such as, but not limited to, a type of hardware device and the serial number of the hardware device.

Further, the chassis manager 104 may maintain a baseline hardware configuration 204 for the hardware devices 108 connected to the enclosure 102. In some examples, the baseline hardware configuration 204 may be captured in response to enabling the tamper detection 208 at the enclosure 102. In some examples, in addition to the baseline hardware configuration 204, the chassis manager 104 may also maintain permissible hardware changes 206 for the hardware devices 108 to determine if any change in hardware device is authorized. Any change in hardware device is compared with the permissible hardware changes 206 to determine if the change in the hardware device is allowed by the customer.

Further, in some examples, the chassis manager 104 may also include tamper detection 208 to determine if changes in hardware devices 108 are to be monitored and managed. In some examples, the tamper detection 208 is a logical or physical tripwire (e.g., a tamper latch) that may be enabled at the enclosure 102 level. In some cases, the tamper detection 208 may be enabled manually by an end-user 112 or by remote instructions from the management device 116. The manageability controller 110 may enable the tamper detection 208 automatically based on the location of the enclosure 102. In one example, chassis manager 104 may receive global location data 212 from the receiver 210 that is mounted on the enclosure 102. In other examples, other types of location data may be used, for example, cell tower triangulation, wireless communication triangulation, etc. Examples of the receiver 210 may include, but are not limited to, a Global Navigation Satellite System (GNSS) receiver and a Global Positioning System (GPS) receiver. The chassis manager 104 may request periodic global location data 212 updates from the receiver 210. On receiving the request, the receiver 210 may deliver the geographical location (e.g., global position) to the chassis manager 104. Geographical location data 212 such as latitude, longitude, altitude, time, and the satellites visible, are stored as geographical location data 212 in the chassis manager 104. The chassis manager 104 may use the geographical location data 212 to calculate and derive information such as acceleration and speed of the enclosure 102. The chassis manager 104 may transmit the geographical location to the manageability controller 110 of the server 106 using the OOB communication channel. In some examples, the chassis manager 104 may share the geographical location with other enclosures (not shown) present at the same geographical location.

Once the tamper detection 208 is enabled, the chassis manager 104 may monitor the hardware devices 108 connected to the enclosure 102. A current hardware configuration of the hardware devices 108 may be compared with the baseline hardware configuration 204 to detect changes in the hardware devices 108. The current hardware configuration refers to a current snapshot of the hardware devices 108 associated with the enclosure 102. When tamper detection 208 is enabled, the chassis manager 104 may periodically determine the current hardware configuration and compare it with the baseline hardware configuration 204. The hardware type and the serial number of each hardware device in the current hardware configuration are compared with the respective hardware type and respective serial number in the baseline hardware configuration 204 to determine a change in the hardware device. Any change in the hardware device may be compared with the permissible hardware changes 206 to determine if the change in hardware device is unauthorized. The permissible hardware changes 206 include changes that may be allowed in the hardware devices 108 connected to the enclosure 102 by the customer. Further, in some examples, if the change in the hardware device is unauthorized a security action may be performed at the chassis manager 104. Additional details of detecting hardware changes and performing the security action by the chassis manager 104 are described in conjunction with FIG. 5.

Further, the chassis manager 104 may detect changes in the hardware devices 108 based on the status of presence pins. The presence pins are placed on slots of the enclosure 102 at which hardware devices 108 are connected. Different types of slots may be present at the enclosure 102 to support different types of hardware devices 108. The presence pins present at each slot of the enclosure 102 close a circuit to indicate the presence of a hardware device in the slot. The chassis manager 104 may receive signals from the presence pins in the slots of the enclosure that indicate the presence of the hardware devices 108. The chassis manager 104 may detect removal of a hardware device and insertion of a new hardware device at a slot based on the status of the presence pin at that slot. The chassis manager 104 may compare the inserted new hardware device with a permissible hardware change for the hardware device defined in the permissible hardware changes 206 to determine if the new hardware device inserted is unauthorized. Additional details of detecting and managing changes at the enclosure 102 based on status of presence pins is described in conjunction with FIG. 6.

Figure 3:
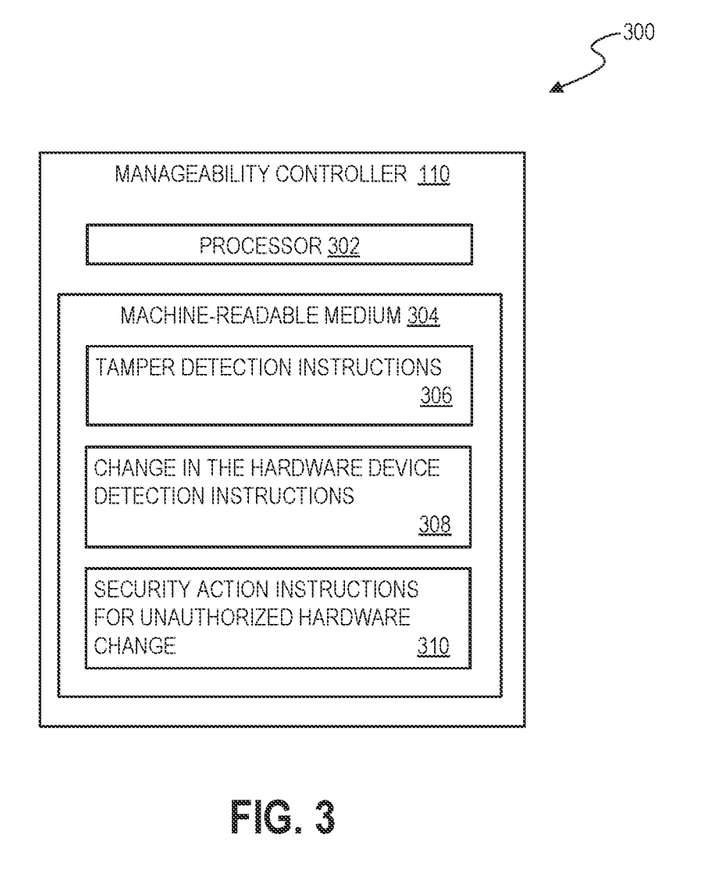
FIG. 3 is a block diagram of an example manageability controller.

Referring now to FIG. 3, a block diagram 300 of an example manageability controller, such as, the manageability controller 110 of the server 106 is depicted. In some examples, the manageability controller 110 may include a processor 302 operably coupled to a machine-readable medium 304 storing executable program instructions is presented. The processor 302 may be an example representative of the processor 118 described in FIG. 1. Similarly, the machine-readable medium 304 may be an example representative of the machine-readable medium 126 described in FIG. 1. The machine-readable medium 304 may be encoded with executable instructions 306, 308, and 310 (hereinafter collectively referred to as instructions 306-310) for managing hardware changes, for example, at the server level. For illustration purposes, FIG. 3 is explained in conjunction with FIG. 1 and FIG. 2.

The processor 302 may be configured to execute instructions 306-310 (e.g., programming or software code) stored in the machine-readable medium 304 for determining unauthorized changes in a set of hardware devices 108 associated with the server 106 and determining the security action if the change is unauthorized. In certain examples, as an alternative or in addition to retrieving and executing the instructions 306-310, the processor 302 may include at least one integrated circuit, other control logic, other electronic circuits, or combinations thereof that include a number of electronic components for performing the functionalities intended to be performed by the manageability controller 110.

The instructions 306, when executed by the processor 302, may cause the processor 302 to determine if the tamper detection 124 is enabled at the server 106. Further, the instruction 308, when executed by the processor 302, may cause the processor 302 to detect a change in the hardware device and determine whether the change in the hardware device is unauthorized. The manageability controller 110 may compare a current hardware configuration of the set of hardware devices 108 to the baseline hardware configuration 120 to detect a change in the set of hardware devices 108 associated with the server 106. Further, the manageability controller 110 may compare the information associated with the change in the hardware device with the permissible hardware changes 122 defined for the server 106 to determine if the change in the hardware device is unauthorized.

Furthermore, the instructions 310, when executed by the processor 302, may cause the processor 302 to perform a security action responsive to determining that the change in hardware device is unauthorized. Security action that may be performed may include, but are not limited to, disabling a connection to the server, powering off the server, permanently disabling the server, transmitting an alert to the management device 116, erasing data from a storage device of the server, or migrating data from the server to an adjacent server. In this example, the adjacent server is another server connected to the enclosure 102.

Figure 4:
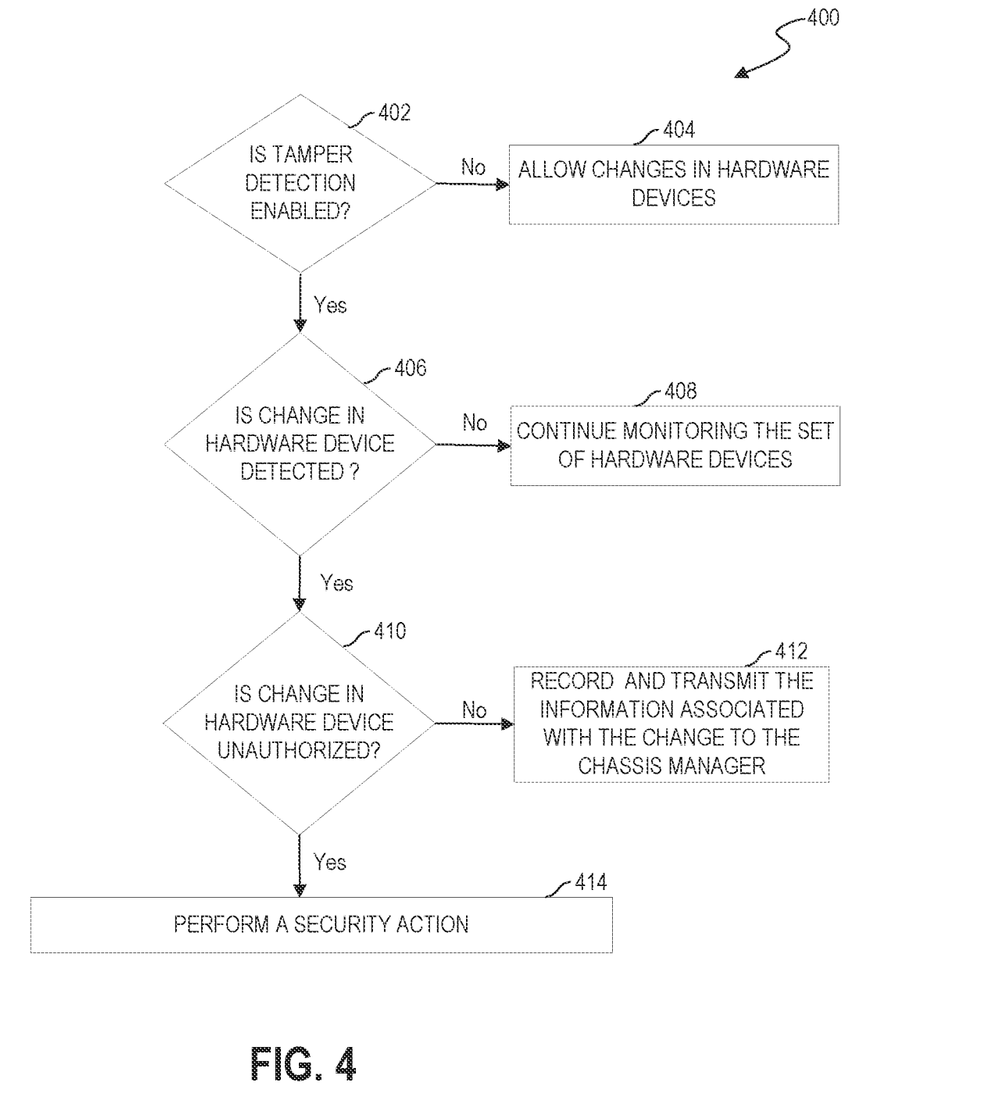
FIG. 4 is a flow diagram of an example method for managing changes in the hardware devices at a server.

FIG. 4 is a flow diagram of an example method 400 for managing changes in the hardware devices 108 by the manageability controller 110 of the server 106. The method 400 may be implemented in the form of executable instructions stored on a machine-readable medium 126 and executed by a processor 118 as shown in FIG. 1. For illustration purposes, the method 400 is described in conjunction with FIG. 1. In some implementations, one or more blocks of the method 400 may be executed concurrently or in a different order than shown. In some implementations, the method 400 may include more or fewer blocks than are shown. Further, in some other implementations, one or more of the blocks of the method 400 may, at certain times, be ongoing and/or may repeat. Furthermore, in some implementations, blocks of the method 400 may be combined.

At block 402, the manageability controller 110 may perform a check to determine if the tamper detection 124 is enabled at the server 106. In some examples, the tamper detection 124 may be enabled on receiving a request from the management device 116 at any stage of deployment of the server 106. At block 402, if the manageability controller 110 determines that the tamper detection 124 is not ("No" at block 402) enabled, the manageability controller 110 may allow changes (at block 404) in the set of hardware devices 108 associated with the server 106. However, at block 402, if the manageability controller 110 determines that tamper detection 124 is enabled ("Yes" at block 402), the manageability controller 110 may start monitoring the set of hardware devices 108 associated with the server 106. In some examples, once the tamper detection 124 is enabled, the manageability controller 110 periodically polls the set of hardware devices 108 to determine a current hardware configuration. In other examples, the manageability controller 110 takes a snapshot of the hardware devices associated with the server 106 to generate the current hardware configuration.

At block 406, the manageability controller 110 may perform a check to determine a change in the hardware devices 108. The manageability controller 110 may compare the current hardware configuration of the set of hardware devices 108 with the baseline hardware configuration 120 of the set of hardware devices 108 to determine if there is any change.

At block 406, if the manageability controller 110 does not detect any change in the set of hardware devices 108, the manageability controller 110, may continue to monitor (at block 408) the set of hardware devices 108 for changes. However, at block 406, if a change in the hardware device is detected ("Yes" at block 408) in the set of hardware devices 108, the manageability controller 110, at block 410, may perform a check to determine whether the change in the hardware is unauthorized. The manageability controller 110 may compare the change in the hardware device with a permissible hardware change for the hardware device to determine if the change is unauthorized. For example, if the detected change is not allowed in the permissible hardware changes 122, the change may be determined as an unauthorized change. If the detected change is identified in the permissible hardware changes 122, the change may be determined as an authorized change.

At block 410, if it is determined that the change in the hardware device is authorized ("No" at block 410), the manageability controller 110, at block 412, may record the change in the hardware device and transmit the information about the change to the chassis manager 104. Upon receiving the information about the change, the chassis manager 104 may update the baseline hardware configuration 204 at the inventory database 214. In some examples, the manageability controller 110 may maintain a log of all the changes in hardware devices that were performed at the server 106. Further, the manageability controller 110 may transmit the log to the management device 116, in some examples.

At block 410, if it is determined that the change in the hardware is unauthorized, the manageability controller 110, at block 414, may perform a security action. As noted hereinabove, a change in the hardware that is not permitted as per the permissible hardware changes 122 may be considered unauthorized. Any unauthorized changes in hardware device may trigger the security action. The security action to be performed at server 106 may be preconfigured by a customer. In some cases, the security action to be performed may be predefined based on the sensitivity of the data being processed by the server 106. In some cases, the security action to be performed may be defined by the customer. Further, the security action to be performed may be based on the hardware device that has changed. Examples of the security action may include, but are not limited to, disabling a connection to the server 106, powering off the server 106, permanently disabling the server 106, transmitting an alert to the management device 116, erasing data from a storage device of the server 106, or migrating data from the server 106 to an adjacent server.

Figure 5:
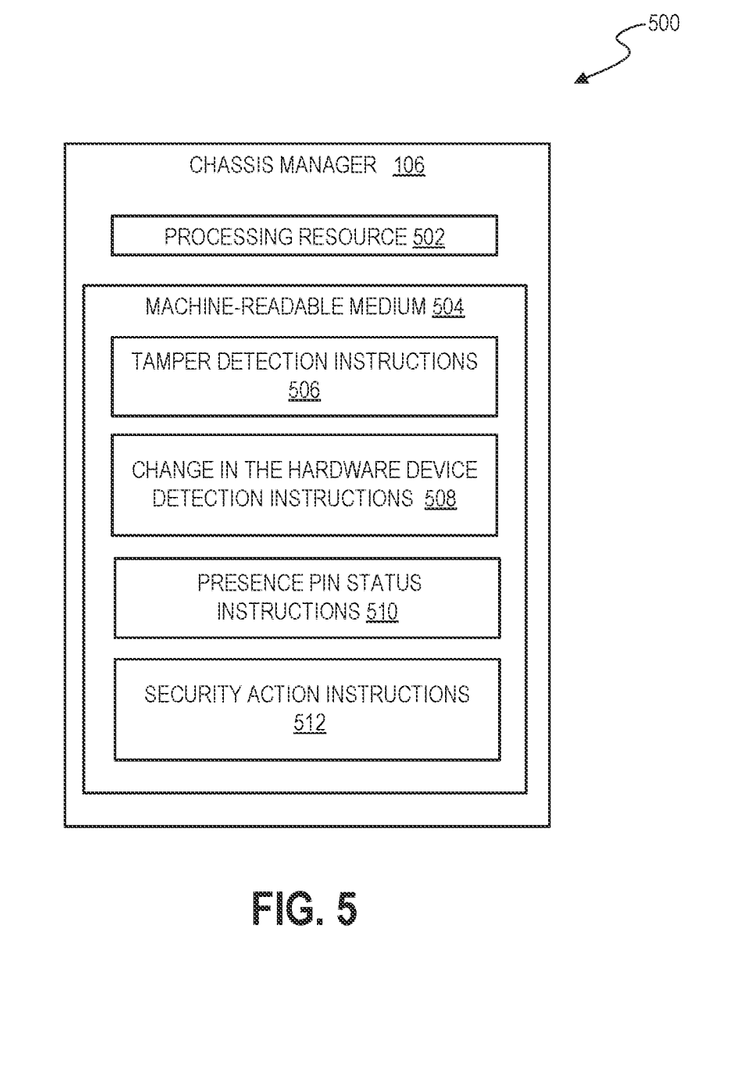
FIG. 5 is a block diagram of an example chassis manager.

Referring now to FIG. 5, a block diagram 500 of an example chassis manager, such as, the chassis manager 104 in the enclosure 102 is depicted. In some examples, the chassis manager 104 may include a processing resource 502 operably coupled to a machine-readable medium 504 storing executable program instructions. The processing resource 502 may be configured for managing changes in the hardware devices 108 of the enclosure 102. The processing resource 502 may be an example representative of the processing resource 202 described in FIG. 2. Similarly, the machine-readable medium 504 may be an example representation of the machine-readable medium 216 described in FIG. 2. The machine-readable medium 504 may be encoded with executable instructions 506, 508, 510, and 512 (hereinafter collectively referred to as instructions 506-512) for managing hardware changes, for example, at the chassis manager 104. For illustration purposes, FIG. 5 is explained in conjunction with FIG. 2.

The processing resource 502 may be coupled to the machine-readable medium 504. The processing resource 502 may be configured to execute instructions 506-512 (e.g., programming or software code) stored in the machine-readable medium 504 for detecting changes in hardware devices 108 present on the enclosure 102 and performing security action if the detected change is unauthorized. In certain examples, as an alternative or in addition to retrieving and executing the instructions 506-512, the processing resource 502 may include at least one integrated circuit, other control logic, other electronic circuits, or combinations thereof that include a number of electronic components for performing the functionalities intended to be performed by the chassis manager 104.

The instructions 506, when executed by the processing resource 502, may cause the processing resource 502 to determine if the tamper detection 208 is enabled. Further, the instructions 508, when executed by the processing resource 502, may cause the processing resource 502 to detect a change in the hardware device and determine whether the change in the hardware device is unauthorized. The chassis manager 104 may perform a hardware polling to determine a current hardware configuration of the hardware devices 108. Further, the chassis manager 104 may compare the current hardware configuration of the hardware devices 108 to a baseline hardware configuration 204 to detect a change in the hardware devices 108 present in the enclosure 102. Furthermore, the chassis manager 104 may compare the information associated with the change in the hardware device with a permissible hardware change for the hardware device defined in the permissible hardware changes 206 to determine if the change in the hardware device is unauthorized. In some cases, on detecting a change in the hardware device, the chassis manager 104 may transmit in a request to enable tamper detection 124 at the manageability controller 110 of the server 106 connected to the enclosure 102.

The instructions 510, when executed by the processing resource 502, may cause the processing resource 502 to determine the status of the presence pins in the slots of the enclosure 102. The status of the presence pins may indicate a presence or absence of a hardware device. Based on the status of the presence pins, the chassis manager 104 may detect that a hardware device was removed and/or another (e.g., a new) hardware device was inserted. The chassis manager 104 may compare the new hardware device with the permissible hardware changes 206 to determine if the new hardware device is authorized.

The instructions 512, when executed by the processing resource 502, may cause the processing resource 502 to perform a security action. The chassis manager 104 may perform the security action at the enclosure 102 in response to determining that the new hardware device (e.g., change in the hardware device) is unauthorized. Examples of the security action may include, but are not limited to, de-energizing a network switch, deactivation of slots in the enclosure 102, disabling operation at the enclosure 102, disabling network interface to server 106, and transmission of an alert to the management device 116 associated with the enclosure.

Figure 6:
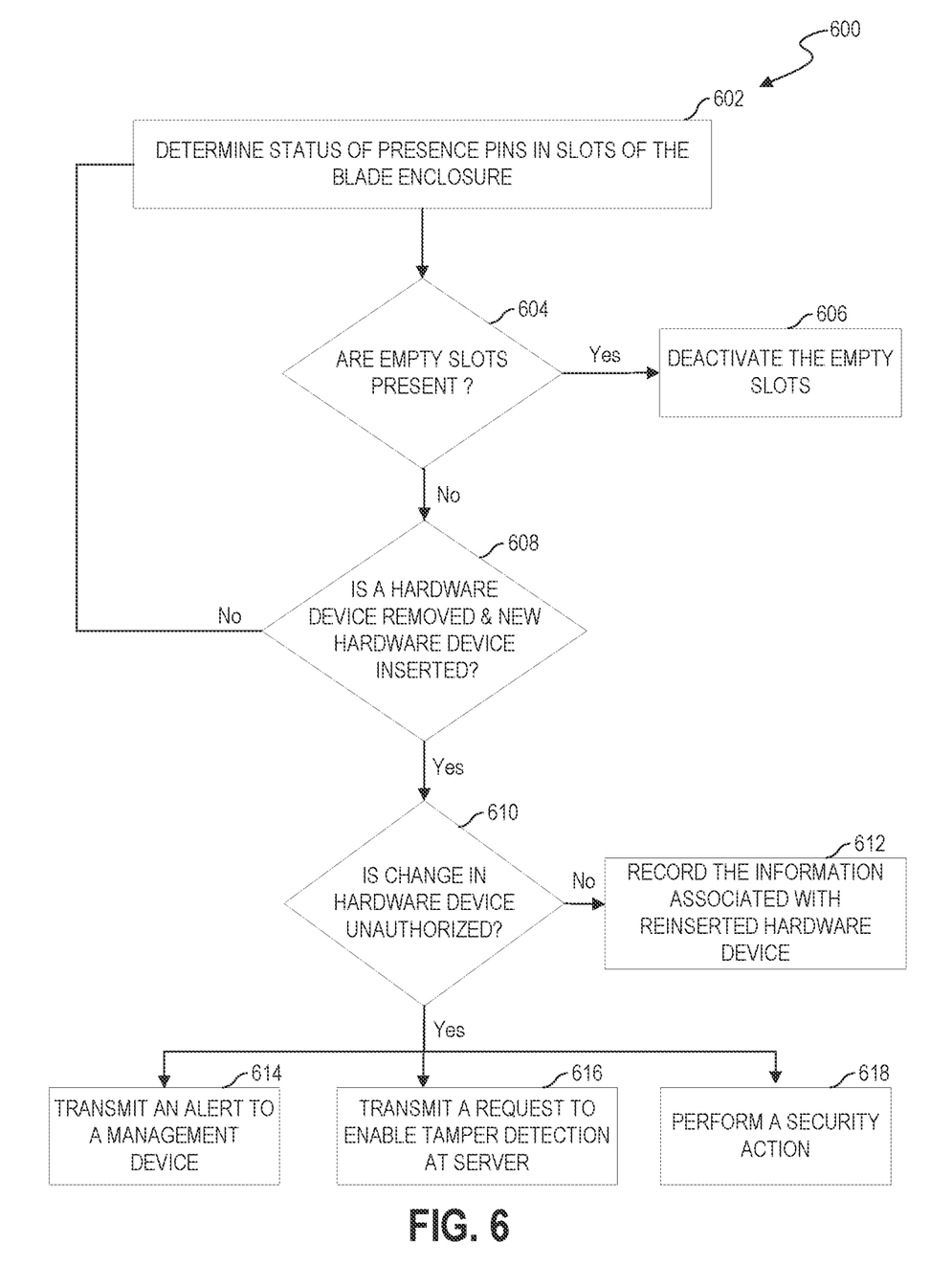
FIG. 6 is a flow diagram of an example method for managing hardware changes at an enclosure based on the status of presence pins.

FIG. 6 is a flow diagram of an example method 600 for detecting changes in the hardware devices 108 at the enclosure 102. The method 600 depicted in FIG. 6 may be implemented in the form of executable instructions stored on a machine-readable medium 216 and executed by a processing resource 202. For example, the method 600 may be performed by the chassis manager 104 of the enclosure 102. For illustration purposes, FIG. 6 is described in conjunction with FIG. 2.

The chassis manager 104 may periodically receive signals from presence pins indicating any change in the hardware devices 108. At block 602, the chassis manager 104 may determine the status of the presence pins in the slots of the enclosure 102 based on the signals. Signals from the presence pins in the slots of the enclosure may be used to indicate the presence or absence of the hardware devices 108 in respective slots.

At 604, the chassis manager 104 may perform a check to determine whether there are empty slots in the enclosure 102. The slots at which no hardware device is present are referred to as empty slots or unpopulated slots. Based on the status of the presence pins, the chassis manager 104 may determine that empty slots are present in the enclosure 102. At block 604, if it is determined ("Yes" at block 604) that empty slots are present in the enclosure 102, the chassis manager 104 may deactivate (at block 606) the empty slots. The chassis manager 104 disables the empty slot (e.g., unpopulated slot) by discontinuing the supply of power to the empty slot. This type of disabling may ensure that any inserted hardware device does not energize on being inserted into the empty slot. In some examples, the empty slots may be disabled the tamper detection 208 is enabled at the enclosure 102. In other examples, the deactivation of the empty slots may be performed at the remote location by the end-user 112.

After the chassis manager 104 determines that there are no empty slots ("No" at block 604), or the empty slots are deactivated (at block 606), the chassis manager 104 may perform a check to determine (at block 608) if a new hardware device has been removed and a new hardware is inserted (e.g., a change in a hardware device at the enclosure 102). The chassis manager 104 detects the removal of the hardware device and insertion of the new hardware device based on the status of the presence pin in the slots of the enclosure 102. In some examples, an interrupt may be trigged from the presence pin, and the chassis manager 104 can detect the removal of the hardware device even if the hardware device is removed and replaced quickly.

Any change in the status of the presence pins may indicate that there has been a change in the hardware device in that slot of the enclosure 102. In an example, the status of presence pins at slots of the enclosure 102 may indicate that a server has been removed and another server has been inserted. In most cases, insertion of a server at a remote location post-deployment may be considered unauthorized.

At block 610, the chassis manager 104 may perform a check to determine if the insertion of the new hardware device is unauthorized. At block 610, the chassis manager 104 may compare the new hardware device inserted at the slot with the inventory database 214 to determine whether the insertion of the new hardware device is unauthorized. In particular, the inserted new hardware device is compared to a permissible hardware change in the permissible hardware change 206 to determine if the insertion of the new hardware device is unauthorized.

At block 610, if the insertion of the new hardware device is authorized (e.g., the inserted hardware device is permitted), the chassis manager 104 may record (at block 612) the information associated with the inserted hardware device. The chassis manager 104 may maintain a log of all the inserted hardware devices (e.g., change in hardware) that was performed at the enclosure 102 and transmits the recorded data to the management device 116. In an example, changing a fan at the enclosure 102 may be considered as an authorized change, and information associated with it may be recorded. Further, the inventory database 214 may be updated with information associated with the inserted hardware device. In another example, the changing of a USB drive connected to the enclosure 102 may be permitted and information associated with it may be recorded.

At block 610, if the insertion of the new hardware device is unauthorized ("yes" at block 610), the chassis manager 104 may perform one or more actions such as operations at one or more of the blocks 614, 616, or 618. For example, at block 614, the chassis manager 104 may be configured to transmit an alert to the management device 116. In some examples, at block 616, the chassis manager 104 may transmit a request to the server 106 to enable tamper detection 124 at the server 106. Further, in some cases, at block 618, the chassis manager 104 may perform a security action (at block 618) at the enclosure 102.

In an example scenario, in which a server is removed from the enclosure 102 and a new server is inserted into the enclosure 102, a change of server may be detected by the chassis manager 104 based on the status of presence pins. If the change happens in a remote location, there is a high probability that a rogue individual has removed a server and inserted a bad server into the enclosure 102. The removal of an existing server may be considered as unauthorized and may trigger a security action. Further, even if an existing server is removed and reinserted back to the slot of the enclosure 102, the change is considered unauthorized depending on the permissible hardware changes 206. In some examples, the chassis manager 104 may disable the network switch port associated with the server or turn-off the power at the corresponding slot. In some examples, an "efuse" device at each slot may be used by the chassis manager 104 to control the power of the associated server hardware at enclosure 102. The efuse may be used by the chassis manager 104 to control the power reaching from the power supply of the enclosure 102 to the hardware device. In some scenarios, the security action performed may render the enclosure 102 inoperable, until the enclosure 102 returns to the base location and a secure recovery key may be received from the management device 116.

Figure 7:
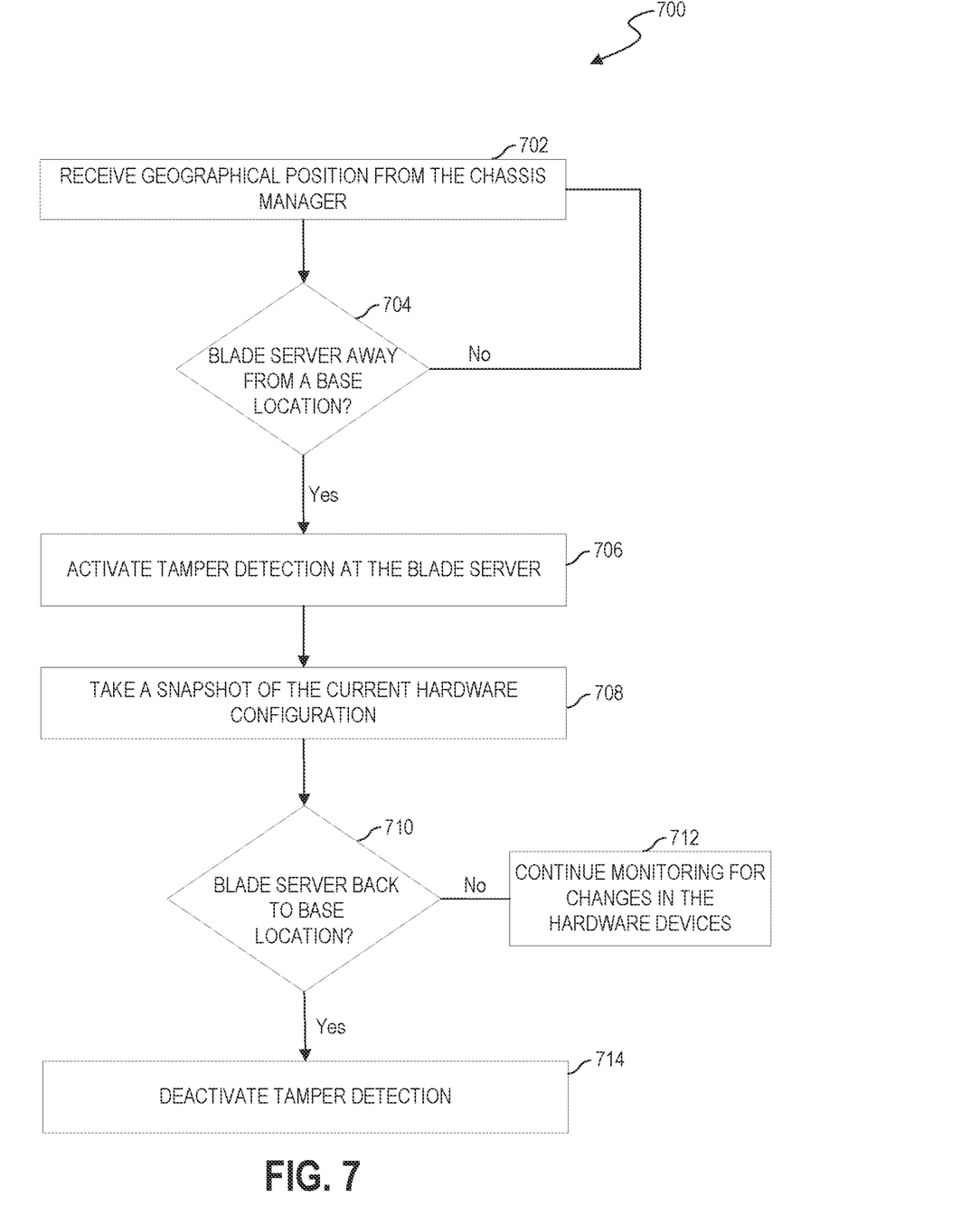
FIG. 7 is a flow diagram of an example method for enabling tamper detection at the server based on geographical location.

FIG. 7 is a flow diagram of an example method 700 for enabling a tamper detection, for example, the tamper detection 124, at the server 106. The method 700 depicted in FIG. 7 may be implemented in the form of executable instructions stored in a memory and executed by a processor. For illustration purposes, FIG. 7 will be described in conjunction with FIG. 1 and FIG. 2. For example, the method 700 may be performed by a manageability controller 110 of the server 106.

At block 702, the manageability controller 110 may receive the geographical location from the chassis manager 104. The geographical location indicates the current location of the enclosure 102 and the server 106. At block 704, the manageability controller 110 may perform a check to determine whether the server 106 is away from a base location. The base location is a customer location. In remote locations, the enclosure may be used for different applications, and the enclosure 102 may be mounted on a mobile device that moves away from the home base location to collect data associated with the application. For example, the enclosure 102 may be mounted on an Unmanned Aerial Vehicle (UAV) that records seismic activity. Any geographical location other than the geographical location associated with the base location indicates that the server 106 is away from the base location.

At block 704, if it is determined that the server 106 is away from the base location, the manageability controller 110, at block 706, may activate the tamper detection 124 at the server 106. On determining that the tamper detection 124 is activated, the manageability controller 110 may start monitoring the hardware changes at the server 106. In some examples, at block 708, the manageability controller may take a snapshot of the set of hardware devices 108 associated with the server 106 to generate a baseline hardware configuration 120.

At block 710, the manageability controller 110 may perform another check to determine whether the server 106 is back to the base location. If the geographical location received at the manageability controller 110 matches the geographical location of the base location, the server 106 is considered to be back at the base location. At block 710, if the manageability controller 110 determines that the server 106 is not ("No" at block 712) back to the base location, the manageability controller 110 continues to monitor the changes in the set of hardware devices 108 at the server 106. Similarly, the chassis manager 104 may continue monitoring the hardware devices 108 for changes in the hardware devices 108.

At block 710, if the manageability controller 110 determines that the server 106 is ("Yes" at block 712) has been moved back to the base location from a remote location, the manageability controller 110 at block 714, may deactivate the tamper detection 124. Further, the manageability controller 110 may stop monitoring the changes in the hardware devices 108. Any security action performed by the manageability controller 110 may be revoked.

The enabling of the tamper detection 124 based on geographic location supports the enclosure 102 that may be traveling between the base location and multiple other locations for processing data related to a task. In an example, the task may be associated with processing data being collected during the exploration of an offshore oil rig. The customer may wish to prevent unauthorized hardware changes by enabling tamper detection 124 before the server 106 leaves the base location before traveling to the location of the offshore oil rig. Although FIG. 7 describes activation and deactivation of tamper detection 124 at the server 106, it should be understood that tamper detection 208 may be enabled at the enclosure 102 similarly based on the geographical location.

While certain implementations have been shown and described above, various changes in form and details may be made. For example, some features that have been described in relation to one implementation and/or process can be related to other implementations. In other words, processes, features, components, and/or properties described in relation to one implementation can be useful in other implementations. Furthermore, it should be appreciated that the systems and methods described herein can include various combinations and/or sub-combinations of the components and/or features of the different implementations described. Thus, features described with reference to one or more implementations can be combined with other implementations described herein.

What is claimed is:

1. A method comprising:
   determining, by a manageability controller of a server, whether a tamper detection is enabled, wherein the tamper detection is enabled to monitor changes in a set of hardware devices that are separate from the server and connected to an enclosure hosted in the server;
   in response to determining that the tamper detection is enabled, determining, by the manageability controller, whether there is a change in a hardware device of the set of hardware devices by comparing a current hardware configuration of the set of hardware devices with a baseline hardware configuration of the set of hardware devices;
   in response to determining that there is a change in the hardware device, determining, by the manageability controller, whether the change in the hardware device is authorized based on a permissible hardware change for the hardware device; and
   transmitting, in response to determining that the change in the hardware device is authorized, information associated with the change in the hardware device to a chassis manager for the chassis manager to update an inventory database, wherein the chassis manager is communicatively coupled to the manageability controller and the set of hardware devices in an enclosure.

2. The method of claim 1, wherein the tamper detection is enabled at the server based on instructions from a management device or by an end-user of the enclosure hosting the server.

3. The method of claim 1, further comprising performing, by the manageability controller, a security action in response to determining that a second change has occurred in the hardware device and that the second change is unauthorized, wherein performing the security action comprises performing at least one of disabling a connection to the server, powering off the server, permanently disabling the server, transmitting an alert to a management device, erasing data from a storage device of the server, or migrating data from the server to another server.

4. The method of claim 1, further comprising:
   receiving, by the manageability controller, a geographical location of the server from the chassis manager; and
   enabling, by the manageability controller, the tamper detection based on the geographical location of the server.

5. The method of claim 4, wherein enabling the tamper detection comprises:
   determining, by the manageability controller, whether the server is away from a base location based on the geographical location; and
   in response to determining that the server is away from the base location, activating, by the manageability controller, the tamper detection.

6. The method of claim 5, further comprising:
   determining, by the manageability controller, whether the server has been moved back to the base location based on the geographical location; and
   in response to determining that the server has been moved back to the base location, deactivating, by the manageability controller, the tamper detection and revoking the security action.

7. The method of claim 1, further comprising:
   determining, by the chassis manager communicatively coupled to the manageability controller, a status of presence pins in slots of the enclosure hosting the server, wherein the status of presence pins indicates presence of the set of hardware devices;
   determining, by the chassis manager, removal of a hardware device in the set of hardware devices and insertion of a new hardware device at a slot of the enclosure based on the status of presence pins; and
   transmitting, by the chassis manager, a request to enable the tamper detection to the manageability controller.

8. The method of claim 7, further comprising:
   determining, by the chassis manager, empty slots in the enclosure; and
   deactivating, by the chassis manager, the empty slots.

9. A manageability controller of a server for managing hardware changes, the manageability controller comprising:
   a processor; and
   a non-transitory machine-readable storage medium coupled to the processor, the non-transitory machine-readable storage medium storing instructions that when executed by the processor causes the processor to:
   determine whether a tamper detection is enabled, wherein the tamper detection is enabled to monitor changes in a set of hardware devices that are separate from the server and connected to an enclosure hosting the server;
   in response to determining that the tamper detection is enabled, determine whether there is a change in a hardware device by comparing a current hardware configuration of the set of hardware devices with a baseline hardware configuration of the set of hardware devices;
   in response to determining that there is change in the hardware device,
   determine whether the change in the hardware device is unauthorized based on a permissible hardware change for the hardware device;
   perform a security action in response to determining that the change in the hardware device is unauthorized; and enable the tamper detection at the server automatically based on a geographical location received from a chassis manager, wherein the geographical location is received by the chassis manager from a receiver in the enclosure.

10. The manageability controller of claim 9, wherein the tamper detection is enabled at the server based on instructions from a management device or by an end-user of the enclosure hosting the server.

11. The manageability controller of claim 9,
wherein performing the security action comprises at least of disabling a connection to the server, powering off the server, permanently disabling the server, transmitting an alert to a management device, erasing data from a storage device of the server, or migrating data from the server to an adjacent server.

12. The manageability controller of claim 9, wherein enabling the tamper detection comprises instructions that when executed by the processor of the manageability controller, causes the processor to:
determine whether the server is away from a base location based on the geographical location; and
in response to determining that the server is away from the base location, activate the tamper detection.

13. The manageability controller of claim 12, wherein enabling the tamper detection comprises instructions that when executed by the processor of the manageability controller, causes the processor to:
determine whether the server has been moved back to the base location based on the geographical location; and
in response to determining that the server has been moved back to the base location, deactivate the tamper detection and revoke the security action.

14. A chassis manager within an enclosure for managing hardware changes, the chassis manager comprising:
a processing resource; and
a non-transitory machine-readable storage medium coupled to the processing resource, the non-transitory machine-readable storage medium storing instructions that when executed by the processing resource causes the processing resource to:
determine a status of presence pins in slots of an enclosure, wherein a plurality of hardware devices are connected to the slots in the enclosure, wherein the status of presence pins indicates presence of the plurality of hardware devices, and wherein the chassis manager is communicatively coupled to the plurality of hardware devices;
determine whether a hardware device is removed and a new hardware device is inserted at a slot of the enclosure based on the status of presence pins;
determine, in response to determining that the hardware device is removed and the new hardware device is inserted in the slot, whether the new hardware device is unauthorized by comparing the new hardware device with a permissible hardware change for the hardware device;
perform a security action in response to determining that the new hardware device is unauthorized; and
enable a tamper detection at the enclosure based on a geographical location received from a receiver in the enclosure.

15. The chassis manager of claim 14, wherein the non-transitory machine-readable storage medium further stores additional instructions that when executed by the processing resource, cause the processing resource to:
determine empty slots in the enclosure; and
deactivate the empty slots.

16. The chassis manager of claim 14, wherein the non-transitory machine-readable storage medium further stores additional instructions that when executed by the processing resource, cause the processing resource to:
transmit a request to enable the tamper detection at a manageability controller of the server connected to the enclosure in response to determining that the new hardware device is unauthorized.

17. The chassis manager of claim 14, wherein performing the security action comprises at least one of de-energizing a network switch, deactivating a slot at the enclosure, disabling an operation at the enclosure, disabling a network interface to the server, and transmission of an alert to a management device associated with the enclosure.

18. The chassis manager of claim 14, wherein the non-transitory machine-readable storage medium further stores additional instructions that when executed by the processing resource, cause the processing resource to revoke the security action performed in response to determining that the enclosure has been brought back from a remote location to a base location.

* * * * *